US009343942B2

(12) United States Patent
Kimata et al.

(10) Patent No.: US 9,343,942 B2
(45) Date of Patent: May 17, 2016

(54) ROTATING ELECTRICAL MACHINE FOR VEHICLE

(75) Inventors: Hirotaka Kimata, Chiyoda-ku (JP); Kazunori Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 233 days.

(21) Appl. No.: 14/237,068

(22) PCT Filed: Nov. 30, 2011

(86) PCT No.: PCT/JP2011/006711
§ 371 (c)(1),
(2), (4) Date: Feb. 4, 2014

(87) PCT Pub. No.: WO2013/080258
PCT Pub. Date: Jun. 6, 2013

(65) Prior Publication Data
US 2014/0203672 A1    Jul. 24, 2014

(51) Int. Cl.
*H02K 11/00* (2006.01)
*H02K 5/18* (2006.01)
(Continued)

(52) U.S. Cl.
CPC .. *H02K 9/06* (2013.01); *H02K 5/10* (2013.01); *H02K 5/225* (2013.01); *H02K 11/046* (2013.01)

(58) Field of Classification Search
CPC .................................. H02K 5/18; H02K 11/00
USPC ..... 310/64, 66, 68 B, 68 D, 68 R, 71, 156.66, 310/156.69, 156.71
See application file for complete search history.

(56) References Cited

U.S. PATENT DOCUMENTS

| 5,710,467 A | * | 1/1998 | Irie | ....................... | H02K 11/046 310/62 |
| 6,034,452 A | * | 3/2000 | Nakamura | ........... | H02K 11/046 310/43 |

(Continued)

FOREIGN PATENT DOCUMENTS

| EP | 0041847 A1 | 12/1981 |
| FR | 2711282 A1 | 4/1995 |

(Continued)

OTHER PUBLICATIONS

International Search Report of PCT/JP2011/006711 dated Dec. 27, 2011.

(Continued)

*Primary Examiner* — Jose Gonzalez Quinones
(74) *Attorney, Agent, or Firm* — Sughrue Mion, PLLC; Richard C. Turner (57) ABSTRACT

A rotating electrical machine for a vehicle includes a protective cover including a protruding portion projected to an opening side from a circumferential edge portion of a through hole formed in a bottom portion, a stud bolt that is inserted into the through hole to fix a rectifier to a portion of a casing at a position on one side in an axial direction, a mold resin including a projecting portion projected toward the protective cover, for electrically insulating the rectifier and the stud bolt from each other, and a fitting fixed to an extending portion of the stud bolt that extends from the through hole. A harness clamp is held by the fitting, and the projecting portion and the protruding portion are arranged at a position so that the projecting portion and the protruding portion are overlapped with each other in the axial direction of the stud bolt.

8 Claims, 7 Drawing Sheets

(51) Int. Cl.
*H02K 9/06* (2006.01)
*H02K 5/10* (2006.01)
*H02K 11/04* (2016.01)
*H02K 5/22* (2006.01)

(56) References Cited

U.S. PATENT DOCUMENTS

| | | | | |
|---|---|---|---|---|
| 6,184,602 | B1 * | 2/2001 | Ooiwa | H02K 11/046 |
| | | | | 310/58 |
| 6,958,557 | B2 * | 10/2005 | Shichijyo | H02K 11/046 |
| | | | | 310/64 |
| 2006/0214523 | A1 | 9/2006 | Itoh | |

FOREIGN PATENT DOCUMENTS

| | | |
|---|---|---|
| JP | 11-018257 A | 1/1999 |
| JP | 2001-346356 A | 12/2001 |
| JP | 2005-102353 A | 4/2005 |
| JP | 4151348 B2 | 9/2008 |
| WO | 2011/039480 A2 | 4/2011 |

OTHER PUBLICATIONS

Communication dated Oct. 28, 2015 from the European Patent Office in counterpart European Application No. 11876605.4.

* cited by examiner

ROTATING ELECTRICAL MACHINE FOR VEHICLE

CROSS REFERENCE TO RELATED APPLICATIONS

This is a National Stage of International Application No. PCT/JP2011/006711 filed Nov. 30, 2011, the contents of which is incorporated herein by reference in its entirety.

TECHNICAL FIELD

The present invention relates to a rotating electrical machine for a vehicle, such as an alternating current (AC) generator for a vehicle, and more particularly, to a holding structure for electric wires arranged around a rotating electrical machine for a vehicle, which is mounted in a vehicle.

BACKGROUND ART

A great number of electric wires are arranged around an AC generator for a vehicle, which is mounted in a vehicle. When those electric wires are excessively long, the electric wires vibrate due to vibration of an engine or the like, with the result that disconnection of the electric wires or the like is liable to occur. Therefore, the electric wires are partially fixed to a vehicle body, the AC generator for a vehicle, or the like.

Further, in a related art AC generator for a vehicle, a rectifier and the like are fixed to an outer side of a rear-side frame, and a rear cover made of a resin is fixed to the rear-side frame so as to cover the rectifier and the like.

In addition, a harness clamp for fixing the electric wires is mounted to be fixed to a projecting portion that is integrally projected from the rear cover (for example, Patent Literature 1).

CITATION LIST

Patent Literature

[PTL 1] JP 4151348 B

SUMMARY OF INVENTION

Technical Problems

The rear cover is generally provided so as to protect components such as the rectifier from exposure to water and adhesion of foreign matter, and hence unlike the front-side and rear-side frames that support a rotor and also support fixing the AC generator for a vehicle to the engine, the rear cover is not required to have high rigidity but is manufactured to have such a thickness that the rear cover can be elastically deformed.

With this, when the harness clamp is mounted to the rear cover made of a resin as in the structure described in Patent Literature 1, the holding strength of the electric wires cannot be increased, and hence in the case where the vibration of the vehicle is significant, the strength of the rear cover for fixing the harness clamp is insufficient. Thus, the harness clamp may fall off from the rear cover.

Therefore, when the harness clamp falls off, the rear cover may be damaged, and as a result of the falling off of the harness clamp, the electric wires may be disconnected due to the vibration.

The present invention has been made to solve the above-mentioned problems, and it is therefore an object thereof to provide a rotating electrical machine for a vehicle capable of suppressing vibration of electric wires, which is caused by vibration of the vehicle, by increasing the holding strength of a harness clamp, to thereby suppress damage to a protective cover and disconnection of the electric wires.

Solution to Problems

According to one embodiment of the present invention, there is provided a rotating electrical machine for a vehicle, including: a rotor rotatably supported in a casing; a stator including a stator core and a stator coil wound around the stator core, the stator being supported by the casing so as to surround the rotor; a rectifier including a positive-electrode side heat sink having positive-electrode side rectifying elements mounted therein, for rectifying AC power generated in the stator coil, the rectifier being arranged outside the casing at a position on one side in an axial direction; a protective cover made of a resin into a bottomed cylindrical shape including a bottom portion having a through hole formed therein and a cylindrical circumferential wall portion, the protective cover including a protruding portion projected in an opening direction from a circumferential edge portion of the through hole, the protective cover being mounted to the casing so as to cover the rectifier; a fixing bolt that is inserted into the through hole and is firmly fixed to the casing at the position on the one side in the axial direction, for fixing the rectifier to the casing; an insulating member including a projecting portion projected toward the protective cover, for electrically insulating the fixing bolt and the positive-electrode side heat sink from each other; a fitting firmly fixed to an extending portion of the fixing bolt that extends from the through hole; and a harness clamp made of a resin, for fixing an electric wire, in which the harness clamp is held by the fitting, and in which the projecting portion and the protruding portion are arranged at a position so that the projecting portion and the protruding portion are overlapped with each other in the axial direction of the fixing bolt.

Advantageous Effects of Invention

According to one embodiment of the present invention, the fixing bolt is inserted into the through hole formed in the bottom portion of the protective cover, and the rectifier is fixed to a portion of the casing at the position on the one side in the axial direction so that the fitting is firmly fixed to the extending portion of the fixing bolt that extends from the through hole. Further, the harness clamp is held by the fitting, and hence the holding strength of the harness clamp can be increased. Therefore, the vibration of the electric wire fixed to the harness clamp, which is caused by the vibration of the vehicle, is suppressed. Thus, the damage to the protective cover and the disconnection of the electric wire can be suppressed.

Further, the protruding portion projected from the circumferential edge portion of the through hole of the protective cover and the projecting portion of the insulating member are arranged at the position so that the protruding portion and the projecting portion are overlapped with each other in the axial direction of the fixing bolt. Thus, entrance of water into the protective cover and intrusion of dust or the like can be suppressed.

DESCRIPTION OF EMBODIMENT

First Embodiment

Figure 1:
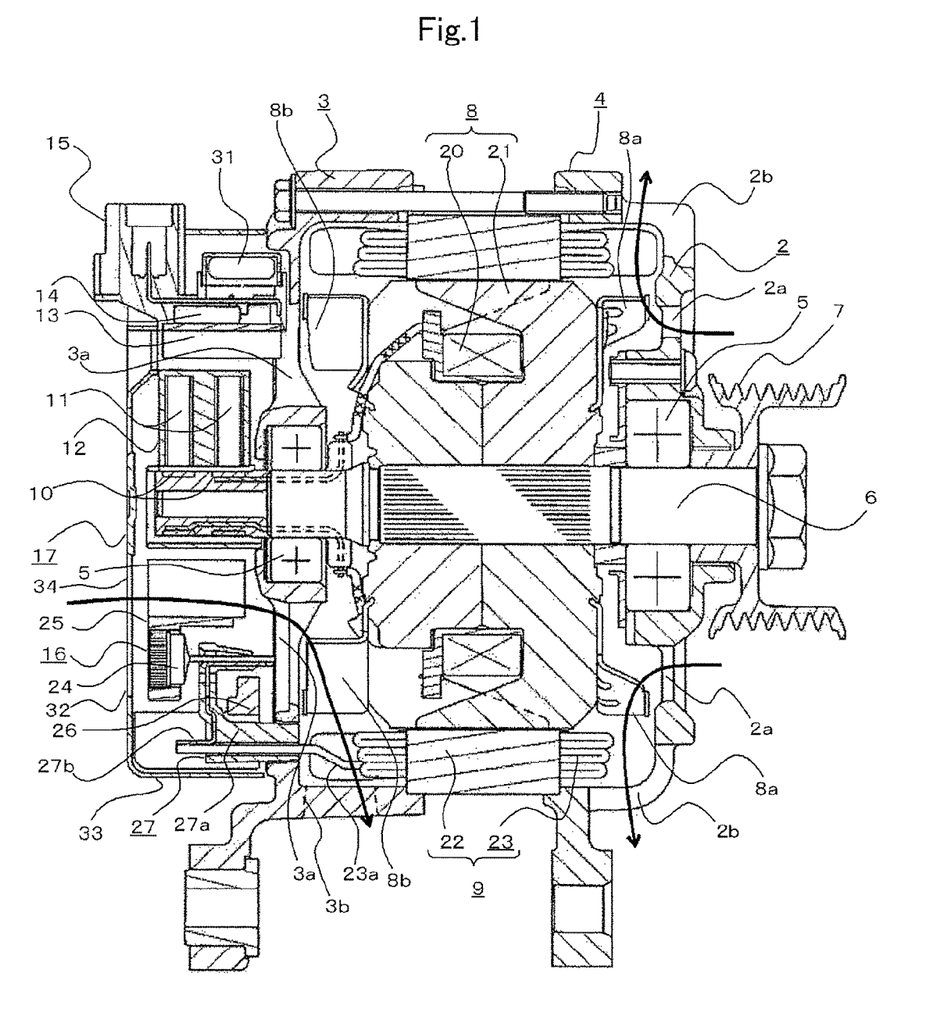
FIG. 1 is a sectional view illustrating an entire AC generator for a vehicle according to a first embodiment of the present invention.
Figure 2:
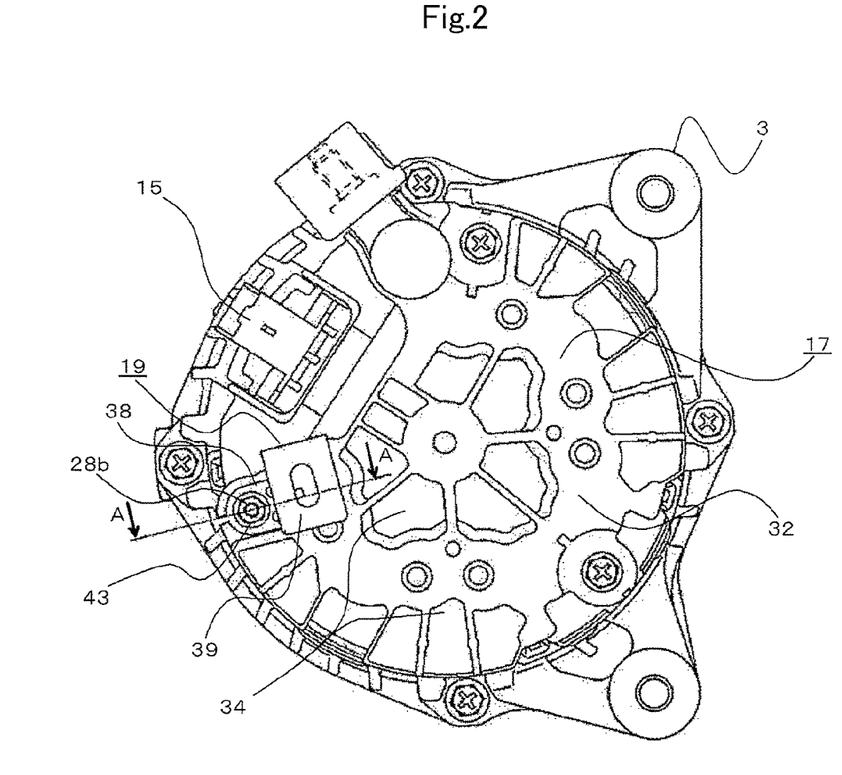
FIG. 2 is a plan view of the AC generator for a vehicle in FIG. 1 as seen from a protective cover side.
Figure 3:
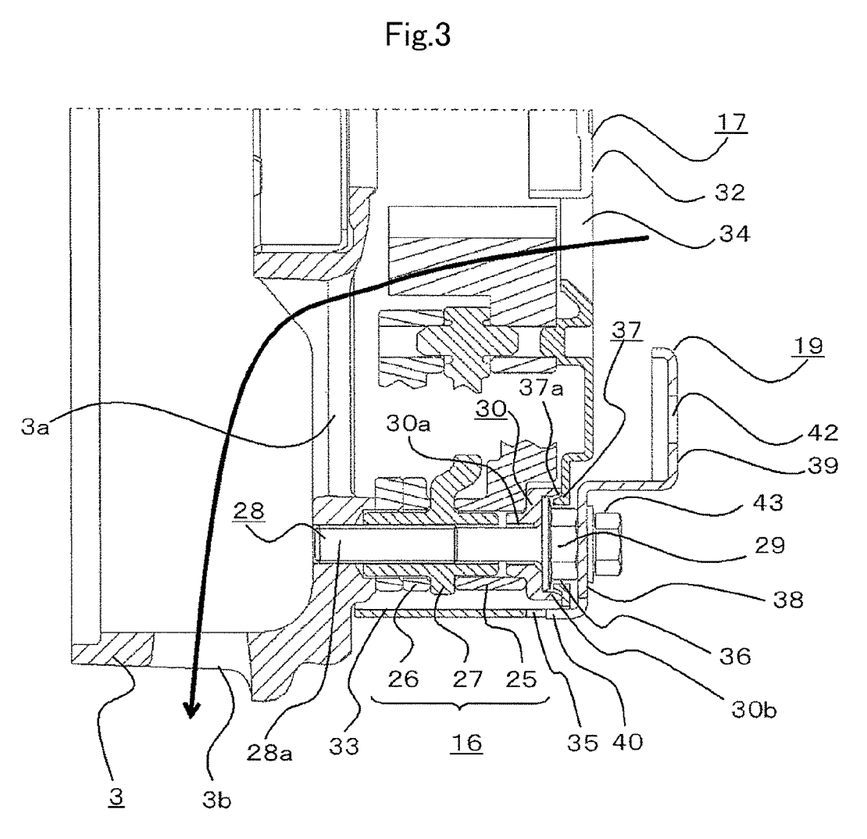
FIG. 3 is a sectional view of the AC generator for a vehicle taken along the arrow A-A in FIG. 2.
Figure 4:
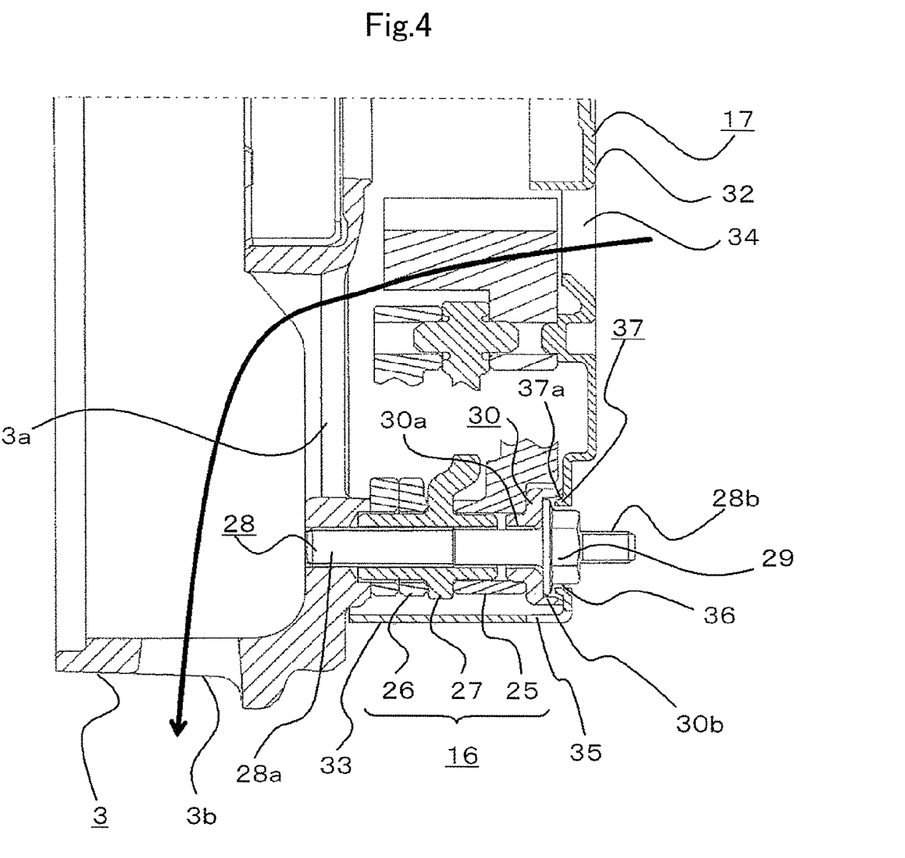
FIG. 4 is a sectional view of a main part of the AC generator for a vehicle, for illustrating a state before a fitting is mounted according to the first embodiment of the present invention.
Figure 5:
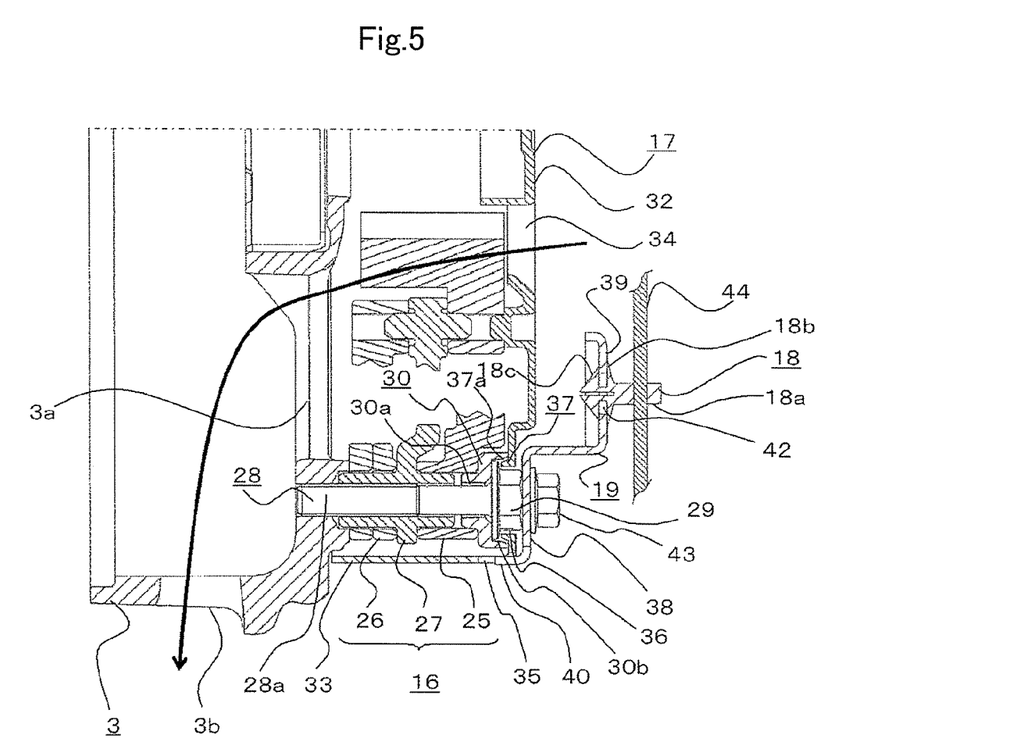
FIG. 5 is a sectional view of a main part of the AC generator for a vehicle, for illustrating a state in which electric wires are fixed according to the first embodiment of the present invention.
Figure 6:
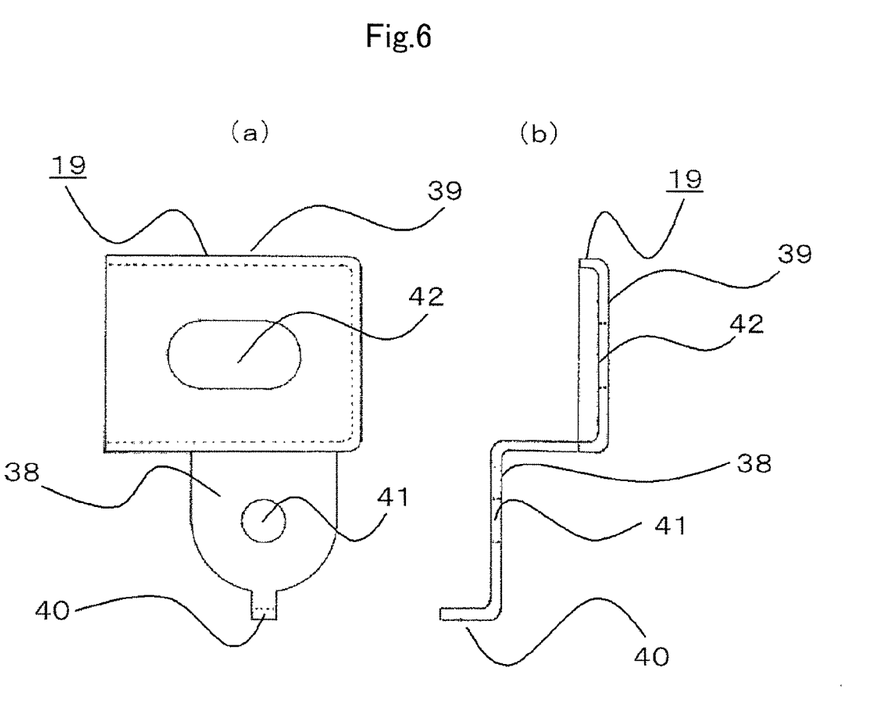
FIG. 6 are views illustrating the structure of the fitting according to the first embodiment of the present invention.
Figure 7:
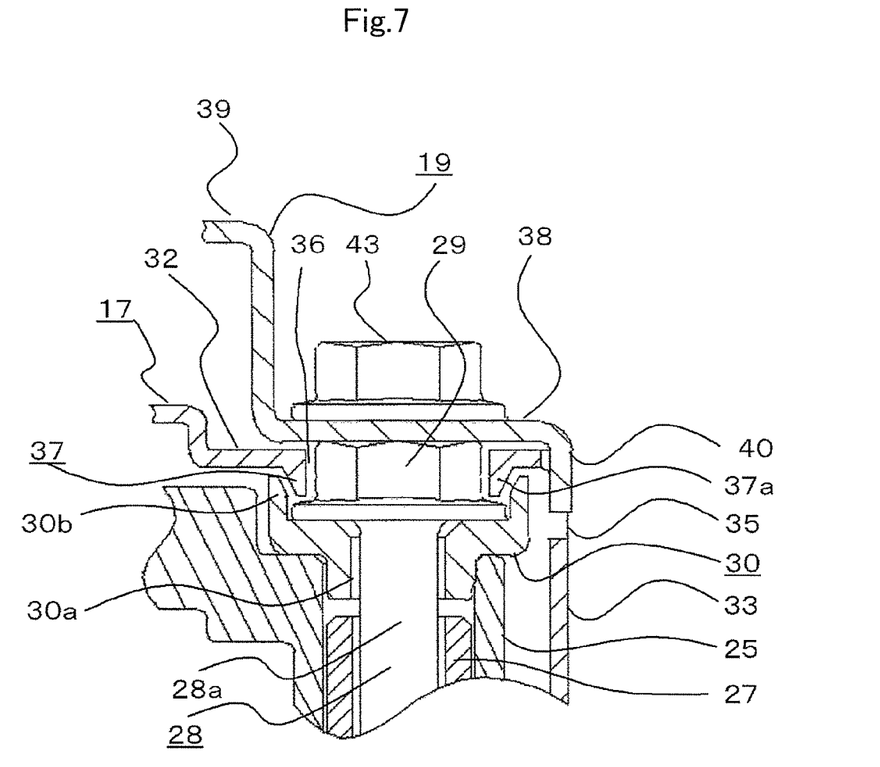
FIG. 7 is an enlarged sectional view of a main part of the AC generator for a vehicle in FIG. 5.

FIG. 1 is a sectional view illustrating an entire AC generator for a vehicle according to a first embodiment of the present invention. FIG. 2 is a plan view of the AC generator for a vehicle in FIG. 1 as seen from a protective cover side. FIG. 3 is a sectional view of the AC generator for a vehicle taken along the arrow A-A in FIG. 2. FIG. 4 is a sectional view of a main part of the AC generator for a vehicle, for illustrating a state before a fitting is mounted according to the first embodiment of the present invention. FIG. 5 is a sectional view of a main part of the AC generator for a vehicle, for illustrating a state in which electric wires are fixed according to the first embodiment of the present invention. FIG. 6 are views illustrating the structure of the fitting according to the first embodiment of the present invention, in which FIG. 6(a) is a top view, and FIG. 6(b) is a side view. FIG. 7 is an enlarged sectional view of a main part of the AC generator for a vehicle in FIG. 5. Note that, in the drawings, the same reference symbols denote the same parts.

In FIG. 1 and FIG. 2, an AC generator 1 for a vehicle includes a casing 4 including a front bracket 2 and a rear bracket 3 that are made of aluminum in a substantially bowl-like shape, a shaft 6 rotatably supported in the casing 4 through an intermediation of a pair of bearings 5, a pulley 7 firmly fixed to an end portion of the shaft 6 that extends to a front side of the casing 4, a rotor 8 fixed to the shaft 6 and arranged in the casing 4, stator 9 fixed to the casing 4 so as to surround the rotor 8, a pair of slip rings 10 fixed to an extending portion of the shaft 6 that extends to a rear side of the casing 4, for supplying a current to the rotor 8, a pair of brushes 11 that slide on surfaces of the slip rings 10, a brush holder 12 for receiving those brushes 11, a voltage regulator 14 including a heat sink 13 arranged on a radially outer side of the brush holder 12, for adjusting a magnitude of an AC voltage generated in the stator 9, a connector 15 arranged on a rear side of the rear bracket 3, for inputting and outputting a signal between the voltage regulator 14 or the like and an external device (not shown), a rectifier 16 arranged on the rear side of the rear bracket 3, for rectifying the AC voltage generated in the stator 9 to a direct current (DC) voltage, a protective cover 17 mounted to the rear bracket 3 so as to cover the brush holder 12, the voltage regulator 14, and the rectifier 16, a fitting 19 to which a harness clamp 18 described later is mounted, and the like.

A plurality of intake holes 2a and 3a are formed in bottom portions of the front bracket 2 and the rear bracket 3 in a substantially bowl-like shape, respectively, and a plurality of exhaust holes 2b and 3b are formed in both outer circumferential shoulder portions of each of the front bracket 2 and the rear bracket 3, respectively.

The rotor 8 is a Lundell-type rotor, and includes a field coil 20 through which an excitation current is caused to flow so as to generate a magnetic flux, and a field core 21 provided so as to cover the field coil 20 and having a magnetic pole generated by a magnetic flux. Front-side cooling fans 8a serving as centrifugal fans are fixed to a front-side end surface of the field core 21, and similarly, rear-side cooling fans 8b serving as centrifugal fans are fixed to a rear-side end surface of the field core 21.

Further, the shaft 6 is mounted through an axial center position of the field core 21. The pair of slip rings 10 is provided at a rear end portion of the shaft 6 that is projected from the rear bracket 3. The slip rings 10 are electrically connected to the field coil 20.

The stator 9 includes a cylindrical stator core 22 and stator coils 23 wound around the stator core 22, for generating an alternating current due to change of a magnetic flux generated in the field coil 20 along with rotation of the rotor 8. The stator 9 is arranged so as to surround the rotor 8 with the stator core 22 interposed between opening ends of the front bracket 2 and the rear bracket 3 from both sides in an axial direction.

The rectifier 16 includes a positive-electrode side heat sink 25 having a plurality of positive-electrode side rectifying elements 24 mounted therein, a negative-electrode side heat sink 26 having a plurality of negative-electrode side rectifying elements (not shown) mounted therein, and a circuit board 27. The rectifier 16 is formed into a substantially C-shape with the circuit board 27 interposed between the positive-electrode side heat sink 25 and the negative-electrode side heat sink 26.

The circuit board 27 includes a resin molded member 27a obtained by molding an insulating resin such as polybutylene terephthalate (PBT) into a substantially C-shape, and a plurality of conductors 27b insert-molded into the resin molded member 27a, for electrically connecting the rectifier 16 and the stator coils 23 to each other. The conductors 27b are connected so that the positive-electrode side rectifying elements 24 and the negative-electrode side rectifying elements form a predetermined bridge circuit through the circuit board 27.

A stud bolt 28 serving as a fixing bolt is a bolt including a first shank portion 28a and a second shank portion 28b each having a threaded portion formed thereon, and at an intermediate part of both the shank portions 28a and 28b, a nut portion 29 is formed. Note that, the nut portion 29 may be formed by increasing diameters of both the shank portions 28a and 28b as well as forming the nut portion 29 by firmly fixing a nut.

As illustrated in FIG. 3, in the rectifier 16 constructed as described above, the positive-electrode side heat sink 25 and the negative-electrode side heat sink 26 are overlapped with each other through an intermediation of the circuit board 27 interposed therebetween. The first shank portion 28a of the stud bolt 28 is inserted through the positive-electrode side heat sink 25, the circuit board 27, and the negative-electrode side heat sink 26. In this manner, the rectifier 16 is fastened and fixed to an outer-side end surface of the rear bracket 3.

In this case, the stud bolt 28 and the negative-electrode side heat sink 26 are electrically insulated from each other by the circuit board 27, and the stud bolt 28 and the positive-electrode side heat sink 25 are electrically insulated from each other by interposing a mold resin 30 serving as an insulating member.

The mold resin 30 having a cylindrical shape includes an insertion hole 30a through which the first shank portion 28a of the stud bolt 28 is inserted. After the first shank portion 28a is inserted through the insertion hole 30a, the nut portion 29 of the stud bolt 28 is brought into abutment against the mold resin 30, and fastening of the stud bolt 28 is thus completed. A projecting portion 30b projected toward the protective cover 17 is provided in an outer circumferential portion of the mold resin 30.

The rectifier 16 fixed to the rear bracket 3 by the stud bolt 28 is arranged on an outer circumferential side of the slip rings 10 in a fan shape about the shaft 6 on a plane orthogonal to the axial center of the shaft 6. Lead wires 23a of the stator coils 23 are drawn out from the rear bracket 3 to be connected to the conductors 27b of the circuit board 27 so that the rectifier 16 and the stator coils 23 are electrically connected to each other.

The brush holder 12 is arranged at a position between both end portions of the rectifier 16 having a substantially C-shape in a circumferential direction, and is fastened and fixed to the outer-side end surface of the rear bracket 3. The voltage regulator 14 having a capacitor 31 for noise reduction and the connector 15 integrally mounted thereon is arranged on the radially outer side of the brush holder 12, and is fastened and fixed to the outer-side end surface of the rear bracket 3.

The protective cover 17 is molded into a bottomed cylindrical shape including a bottom portion 32 and a circumferential wall portion 33 with the use of an insulating resin such as PBT and nylon 66. A plurality of intake holes 34 are formed in the bottom portion 33 along concentric circles, and the intake holes 34 are opposed to the heat sink 13 of the voltage regulator 14 and the positive-electrode side heat sink 25 of the rectifier 16.

Further, as illustrated in FIG. 3, a drain hole 35 is formed in the circumferential wall portion 33 on the bottom portion 32 side, and a through hole 36 through which the second shank portion 28b of the stud bolt 28 is caused to pass is formed in the bottom portion 32 in proximity to the drain hole 35. Note that, the drain hole 35 is formed in the circumferential wall portion 33 in a direction facing the ground, specifically, at a position facing vertically downward when the AC generator 1 for a vehicle is mounted in a vehicle.

In addition, on a circumferential edge portion of the through hole 36 on an opening side, a protruding portion 37 is provided toward the rear bracket 3. In this embodiment, the protruding portion 37 has a tapered portion 37a on an outer circumferential side thereof so as to be tapered toward a distal end thereof.

The protective cover 17 constructed as described above is fixed to the rear bracket 3 with an opening side thereof facing the rear bracket 3 so as to cover the rectifier 16, the brush holder 12, and the voltage regulator 14. In this case, the nut portion 29 and the second shank portion 28b of the stud bolt 28 extend from the through hole 36.

Further, when the protective cover 17 is fixed to the rear bracket 3, the protruding portion 37 provided on the through hole 36 is arranged between an outer circumferential side of the nut portion 29 and an inner circumferential side of the projecting portion 30b of the mold resin 30, and the protruding portion 37 and the projecting portion 30b of the mold resin 30 are arranged at a position so that the protruding portion 37 and the projecting portion 30b are partially overlapped with each other in an axial direction of the stud bolt 28 through an intermediation of an air gap. In this manner, the labyrinth structure for suppressing entrance of water or the like from the through hole 37 is provided.

As illustrated in FIG. 6, the fitting 19 is manufactured, for example, through press molding on a flat metal plate made of stainless steel or the like, and the fitting 19 includes a fixing portion 38, a holding portion 39 integrally extending from one end of the fixing portion 38, and a rotation stopper portion 40 formed by being bent from another end of the fixing portion 38 at a right angle. A stud bolt insertion hole 41 is formed in the fixing portion 38 by boring, and a harness clamp holding hole 42 is formed in the holding portion 39 by boring.

In addition, as illustrated in FIG. 3, the fitting 19 is mounted to the stud bolt 28 by inserting, into the stud bolt insertion hole 41, the second shank portion 28b extending from the through hole 36 of the protective cover 17, and the fixing portion 38 is fixed to the stud bolt 28 due to a fastening force of a nut 43 threadedly engaged with the second shank portion 28b by being interposed between the nut 43 and the nut portion 29 so as to cover the through hole 36 of the protective cover 17. In this case, the rotation stopper portion 40 is fitted into the drain hole 35 of the protective cover 17 to prevent rotation of the fitting 19 along with the fastening of the nut 43.

The harness clamp 18 is a resin molded member made of an insulating resin such as PBT and nylon 66, and as illustrated in FIG. 5, the harness clamp 18 includes a holding portion 18a for holding an electric wire 44, a seating portion 18b formed at one end of the holding portion 18a, and a pair of snap fit claws 18c extending from the seating portion 18b.

In addition, in order to mount the harness clamp 18 to the fitting 19, the electric wire 44 is fixed to the holding portion 18a, and then the pair of snap fit claws 18c is inserted into the harness clamp holding hole 42 of the holding portion 39 so that the harness clamp 18 is coupled to the fitting 19 in a snap fitting manner. Thus, the seating portion 18b is seated on an outer circumferential surface of the holding portion 39, and distal end protruding portions of the snap fit claws 18c are seated on an inner circumferential surface of the holding portion 39. In this manner, the harness clamp 18 is held by the holding portion 39.

In the AC generator for a vehicle 1 constructed as described above, a field current is supplied to the field coil 20 from a battery (not shown) through the brushes 11 and the slip rings 10 to generate a magnetic flux. The magnetic flux causes claw-shaped magnetic poles of the field core 21 to be magnetized to have an N pole and an S pole alternately in the circumferential direction. On the other hand, rotational torque of an engine is transmitted to the shaft 6 through a belt (not shown) and the pulley 7 to rotate the rotor 8. A rotational magnetic field is applied to the stator coils 23 of the stator 9, and an electromotive force is generated in the stator coils 23. Then, the AC electromotive force generated in the stator coils 23 is rectified into a direct current by the rectifier 16, and the magnitude of the output voltage is adjusted by the voltage regulator 14 so that the electromotive force is supplied to the battery and an on-vehicle electric load.

In this case, the front-side cooling fan 8a and the rear-side cooling fan 8b rotate in association with the rotation of the rotor 8. As illustrated in FIG. 1, on the front side, air is sucked from the intake holes 2a into the front bracket 2, and flows in the axial direction to reach the rotor 8. Then, the flow direction of the air is bent into a centrifugal direction by the front-side cooling fan 8a. The air flowing in the direction bent into the centrifugal direction cools a coil end of each of the stator coils 23 to be exhausted from the exhaust holes 2b to the outside of the front bracket 2.

On the other hand, on the rear side, air is sucked from the intake holes 34 into the protective cover 17, and cools the rectifier 16, the voltage regulator 14, and the like to flow toward the rear bracket 3. Then, the air is sucked from the intake holes 3a into the rear bracket 3, and flows in the axial direction to reach the rotor 8. Then, the flow direction of the air is bent into the centrifugal direction by the rear-side cooling fan 8b. The air flowing in the direction bent into the centrifugal direction cools the coil end of each of the stator coils 23 to be exhausted from the exhaust holes 3b to the outside of the rear bracket 3.

According to the first embodiment, the fitting 19 is fastened and fixed to the stud bolt 28 that fastens and fixes the rectifier 16 to the rear bracket 3, and the harness clamp 18 is held by the fitting 19. Therefore, a holding member for the harness clamp 18 can be made of a metal material so that the holding strength of the harness clamp 18 becomes significantly higher as compared to that in the related art in which the harness clamp is held by the projecting portion integrally provided in a projecting manner to the protective cover made of a resin. With this, vibration of the electric wire 44 that is caused by vibration of the vehicle or the like is suppressed. Thus, damage to the protective cover 17 and disconnection of the electric wire 44 can be suppressed.

In addition, the fixing portion 38 of the fitting 19 is fixed to the stud bolt 28 by being interposed between the nut 43 and the nut portion 29 so as to cover the through hole 36 of the protective cover 17, and hence entrance of water and intrusion of dust or the like from the through hole 36 into the protective cover 17 are suppressed. Thus, the reliability and durability of the AC generator for a vehicle can be enhanced.

Further, the protruding portion 37 provided on the circumferential edge portion on the opening side of the through hole 36 of the protective cover 17 and the projecting portion 30b of the mold resin 30 are arranged at the position so that the protruding portion 37 and the projecting portion 30b are overlapped with each other in the axial direction of the stud bolt 28. Therefore, the labyrinth structure can be formed, and entrance of water and intrusion of dust or the like from the through hole 36 into the protective cover 17 are suppressed. Thus, the reliability and durability of the AC generator for a vehicle can be enhanced. In addition, a leakage current between the rectifier 16 and the rear bracket 3 and generation of rust on the rear bracket 3 due to entrance of water into the protective cover 17 can be suppressed.

Further, the protective cover 17 is not involved in the holding structure for the harness clamp 18, and hence the harness clamp 18 can be held by the rear bracket 3 irrespective of the shape of the protective cover 18. Accordingly, the degree of freedom in design of the protective cover 17 is increased. Thus, the mountability on a vehicle of the AC generator for a vehicle can be enhanced.

In addition, the stud bolt 28 is inserted through the insertion hole 30a of the mold resin 30. Therefore, when the stud bolt 28 is fastened to the rear bracket 3, the mold resin 30 can be fixed, and hence there is no need to additionally provide fixing means for the mold resin 30.

Further, in a case where a joining portion between metals of different kinds is provided to the inside of the protective cover 17, for example, in a case where the lead wires 23a of the stator coils and the conductors 27b of the circuit board 27 are joined with metals of different kinds so as to electrically connect the rectifier 16 and the stator coils 23, electrolytic corrosion may occur at the joining portion therebetween. In this embodiment, however, entrance of water and intrusion of dust or the like into the protective cover 17 are suppressed, and hence the electrolytic corrosion at the joining portion between the metals of different kinds can be suppressed. Thus, the reliability and durability of the AC generator for a vehicle can be enhanced.

Further, in this embodiment, the rear-side cooling fan 8b of the rotor 8 causes air to be sucked from the intake holes 34 into the protective cover 17 so that the air cools the rectifier 16 and the like to flow toward the rear bracket 3.

In this case, the air is sucked into the protective cover 17 also from a gap between the through hole 36 of the protective cover 17 and the stud bolt 28. As illustrated in FIG. 3, however, this portion is not a main flow path for the air that cools the positive-electrode side heat sink 25 of the rectifier 16.

Therefore, the protruding portion 37 and the projecting portion 30b form the labyrinth structure in the gap between the through hole 36 and the stud bolt 28, and the flow of the air that is sucked from the gap is blocked. As a result, the amount of the air that is sucked from the intake holes 34 into the protective cover 17 can be increased, and hence the cooling efficiency for the rectifier 16 can be increased. Thus, the reliability and durability of the AC generator for a vehicle can be enhanced.

In addition, in this embodiment, in the circumferential wall portion 33 of the protective cover 17 on the bottom portion 32 side, the drain hole 35 is formed so as to be located vertically below the protective cover 17. Therefore, even if water enters the inside of the protective cover 17 due to exposure of a large amount of water, the water can be reliably drained to the outside. Thus, the reliability and durability of the AC generator for a vehicle can be enhanced.

Further, the protective cover 17 of this embodiment has such a simple structure that the through hole 36 and the protruding portion 37 are provided to the protective cover of the related art. Thus, change in a molding die for the protective cover 17 is minor, and hence the cost increase can be suppressed to the extent possible.

Further, the protruding portion 37 of the protective cover 17 has the tapered portion 37a on the outer circumferential side thereof so as to be tapered toward the distal end thereof. When the protective cover 17 is fixed to the rear bracket 3, the protective cover 17 needs to be brought closer to the rear bracket 3 so that the position of the through hole 36 thereof matches with the position of the nut portion 29. The protruding portion 37 has the tapered portion 37a, and hence an inner circumferential portion of the projecting portion 30b and the tapered portion 37a are first brought into contact with each other to functions as a guide when fixing the protective cover 17. Thus, the easiness of the fixing of the protective cover 17 can be enhanced.

Further, in a case where a tapered portion (not shown) is provided on an inner circumferential side of the protruding portion 37 instead of the outer circumferential side thereof, when the protective cover 17 is brought closer to the rear bracket 3, an outer circumferential portion of the nut portion 29 and the tapered portion are first brought into contact with each other to function as the guide.

Note that, it is apparent that tapered portions may be provided on both the outer circumferential side and the inner circumferential side of the protruding portion 37. On the other hand, when the above-mentioned tapered portions are not provided, it is possible to prevent the protruding portion 37 from being thinned. Thus, the moldability of the protruding portion 37 is not deteriorated.

Further, the protruding portion 37 is not necessarily provided over the entire circumference of the through hole 36, but may be provided at least at part thereof, for example, only at a portion facing vertically upward in the AC generator 1 for a vehicle.

In addition, in the above-mentioned embodiment, the protruding portion 37 and the projecting portion 30b are arranged through an intermediation of an air gap so that the labyrinth structure is formed between the protruding portion 37 and the projecting portion 30b. However, the present invention is not limited thereto. In a case of the structure in which the protruding portion 37 is press-fitted to the projecting portion 30b while being brought into abutment thereagainst, although the easiness of the fixing of the protective cover 17 is deteriorated, entrance of water and intrusion of dust or the like can be effectively suppressed.

Further, the protruding portion 37 provided on the through hole 36 of the protective cover 17 is arranged between the outer circumferential side of the nut portion 29 and the inner circumferential side of the projecting portion 30b of the mold resin 30. However, the present invention is not limited thereto, and the protruding portion 37 may be arranged on an outer circumferential side of the projecting portion 30b.

Note that, in the above-mentioned embodiment, the AC generator for a vehicle is described. However, the present invention is not limited thereto, and the same effects can be obtained when the present invention is applied to a rotating electrical machine for a vehicle, such as an electric motor for a vehicle or a generator motor for a vehicle.

In addition, in the above-mentioned embodiment, the circumferential wall portion 33 of the protective cover 17 is formed into a cylindrical shape. However, the present invention is not limited thereto, and the circumferential wall portion 33 may be formed into a shape other than the cylindrical shape as long as the circumferential wall portion 33 surrounds the rectifier 16 fixed to the outer-side end surface of the rear bracket 3.

REFERENCE SIGNS LIST 4 casing
8 rotor
8b rear-side cooling fan
9 stator
16 rectifier
17 protective cover
18 harness clamp
19 fitting
22 stator core
23 stator coil
23a lead wire
24 positive-electrode side rectifying element
25 positive-electrode side heat sink
27b conductor
28 stud bolt (fixing bolt)
30 mold resin (insulating member)
30a insertion hole
30b projecting portion
32 bottom portion
33 circumferential wall portion
34 intake hole
35 drain hole
36 through hole
37 protruding portion
37a tapered portion
44 electric wire

The invention claimed is:

1. A rotating electrical machine for a vehicle, comprising:
a rotor rotatably supported in a casing;
a stator comprising a stator core and a stator coil wound around the stator core, the stator being supported by the casing so as to surround the rotor;
a rectifier comprising a positive-electrode side heat sink having positive-electrode side rectifying elements mounted therein, for rectifying AC power generated in the stator coil, the rectifier being arranged outside the casing at a position on one side in an axial direction;
a protective cover made of a resin into a bottomed cylindrical shape including a bottom portion having a through hole formed therein and a cylindrical circumferential wall portion, the protective cover comprising a protruding portion projected in an opening direction from a circumferential edge portion of the through hole, the protective cover being mounted to the casing so as to cover the rectifier;
a fixing bolt that is inserted into the through hole and is firmly fixed to the casing at the position on the one side in the axial direction, for fixing the rectifier to the casing;
an insulating member comprising a projecting portion projected toward the protective cover, for electrically insulating the fixing bolt and the positive-electrode side heat sink from each other; a fitting firmly fixed to an extending portion of the fixing bolt that extends from the through hole; and
a harness clamp made of a resin, for fixing an electric wire, wherein the harness clamp is held by the fitting, and
wherein the projecting portion and the protruding portion are arranged at a position so that the projecting portion and the protruding portion are overlapped with each other in the axial direction of the fixing bolt.

2. A rotating electrical machine for a vehicle according to claim 1, wherein the projecting portion and the protruding portion are arranged through an intermediation of an air gap.

3. A rotating electrical machine for a vehicle according to claim 1, wherein the projecting portion and the protruding portion are arranged in abutment against each other.

4. A rotating electrical machine for a vehicle according to claim 1, wherein the insulating member has an insertion hole through which the fixing bolt is inserted.

5. A rotating electrical machine for a vehicle according to claim 1, wherein the protective cover comprises a joining portion between metal materials of different kinds.

6. A rotating electrical machine for a vehicle according to claim 1,
wherein the rotor further comprises a cooling fan, and
wherein the bottom portion of the protective cover has an intake hole provided therein at a position opposed to the rectifier, for cooling air inside the protective cover by the cooling fan.

7. A rotating electrical machine for a vehicle according to claim 1, wherein the cylindrical circumferential wall portion of the protective cover has a drain hole formed therein.

8. A rotating electrical machine for a vehicle according to claim 1, wherein the protruding portion comprises a tapered portion so as to be tapered toward a distal end thereof.

* * * * *